United States Patent Office 3,431,682
Patented Mar. 11, 1969

3,431,682
MACHINE FOR GRINDING TOOLS WITH A HELICAL CUT
Robert Habib, 36 Quai Gustave Ador, Geneva, Switzerland
Filed May 27, 1966, Ser. No. 553,461
Claims priority, application Switzerland, May 31, 1965, 7,507/65
U.S. Cl. 51—123                                   7 Claims
Int. Cl. B24b 3/42, 5/16

ABSTRACT OF THE DISCLOSURE

This disclosure concerns a machine for grinding a tool with a helical cutting edge which includes a wheel head adapted to receive a grinding wheel, the tool holder table subjected to an alternating to and fro movement, a head-stock having a spindle and a tail-stock mounted on the table and adapted to receive the tool to be ground therebetween, a device for angularly driving the spindle of the head-stock arranged in a manner that the tool effects, with respect to the wheel, a helical movement such that the wheel remains always in contact with the surface to be ground during grinding, and a device permitting the relative position of the wheel and the tool to be varied progressively in a manner to be able to achieve this grinding automatically by successive stages and wherein the device for angularly driving the spindle has at least one rectilinear cam inclined with respect to the axis of the spindle at an angle corresponding to the slope of the helical generatrix of the tool to be ground, at least one feeler in contact with the cam and a servomotor angularly driving the spindle of the head-stock as a function of the relative displacement of the cam and the feeler perpendicular to the axis, when either the cam or the feeler is driven in direction of the axis, the machine having also a first slider adapted to be moved perpendicularly to the reference axis, a traversing screw engaged with this slider, a second slider kinematically connected to the screw and carrying the cam, means permitting the first slider to be displaced by a definite amount in one direction, when the table reaches one of its end positions, and in the opposite direction, when the table returns to its other end position, and means for angularly driving the screw in a predetermined direction to displace the said second slider in a manner corresponding to the variation desired for the relative position of the wheel and the tool.

---

The present invention has for its object a machine for grinding tools with a helical cut, comprising a wheel head, a tool holder table subjected to an alternating to and fro movement, a head-stock and a tail-stock mounted on the table, between which is disposed the tool to be ground, a device for the angular driving of the spindle of the head-stock arranged so that the tool effects, with respect to the wheel, a helical movement such that the wheel remains always in contact with the surface to be ground during all its work, and finally a device permitting the relative position of the wheel and the tool to be varied progressively with its grinding so as to be able to achieve automatically this grinding by successive phases, in which the device for angular driving of the spindle comprises at least one rectilinear cam inclined with respect to a reference axis at an angle corresponding to the slope of the helical generatrix of the tool to be ground, at least one feeler in contact with the cam and a servomotor driving angularly the spindle of the head-stock as a function of the relative displacement of the cam and of the feeler perpendicularly to said reference axis when at least one of these members is driven in that axis.

This machine is characterised by a first slider adapted to be moved perpendicularly to said reference axis, by a traversing screw engaged with this slider, by a second slider connected kinematically to the screw and carrying the said cam, by means permitting the first slider to be displaced by a definite quantity in one direction, when the table reaches one of its extreme positions, and in the opposite direction, when it reaches the other position, by means angularly driving the screw at some instants and in a predetermined direction to displace the said second slider in a way corresponding to the variation desired for the relative position of the wheel and the tool.

The accompanying drawings show, by way of example, one embodiment of the machine of the present invention.

The machine shown (FIGURES 1 and 2) comprises a frame 1 supporting a horizontal table 2 driven in an alternating to and fro movement running to meet a grinding wheel-head 3 fixed to the end of a support 4 standing up on a slider 5 adapted to be driven perpendicularly to the table 2 through a window 1a formed in the frame 1. The displacement of the slider 5 can be effected manually by actuating one of the wheels 5a or 5b or mechanically by means not shown.

Figure 1:
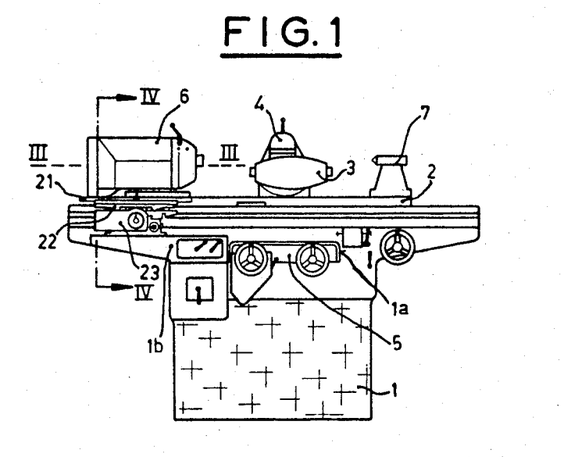
FIGURE 1 is a front view in elevation.
Figure 2:
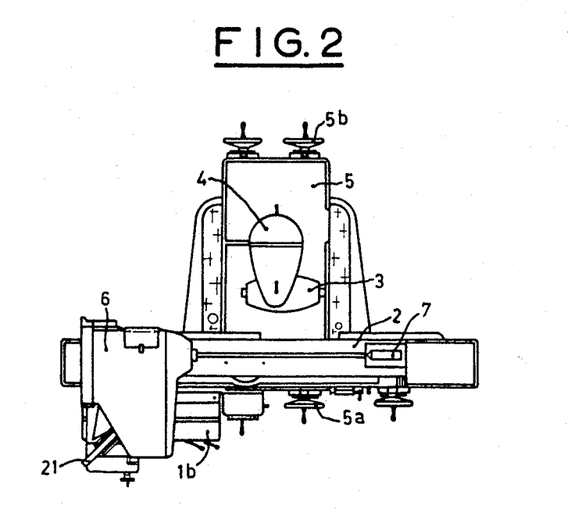
FIGURE 2 is a plan view.

The support 4, which is already known, is such that the head 3 can be placed in various positions while angularly displacing one or the other part of this support.

On the table 2 are mounted a head-stock 6 and a tail-stock 7 between which is disposed in pivoting fashion the milling cutter (not shown) which it is desired to re-grind. The securing of the milling cutter can be achieved in any known way and will not be described in a particular way.

This cutter is thus driven horizontally by the table 2 and rotationally about itself by the head-stock 6: the composition of these two displacements must be such that the cutter is subjected to a helical movement such that the wheel carried by the head 3 remains constantly tangential to the face $a$ of each tooth $b$ (FIGURE 10) of this cutter.

Figure 3:
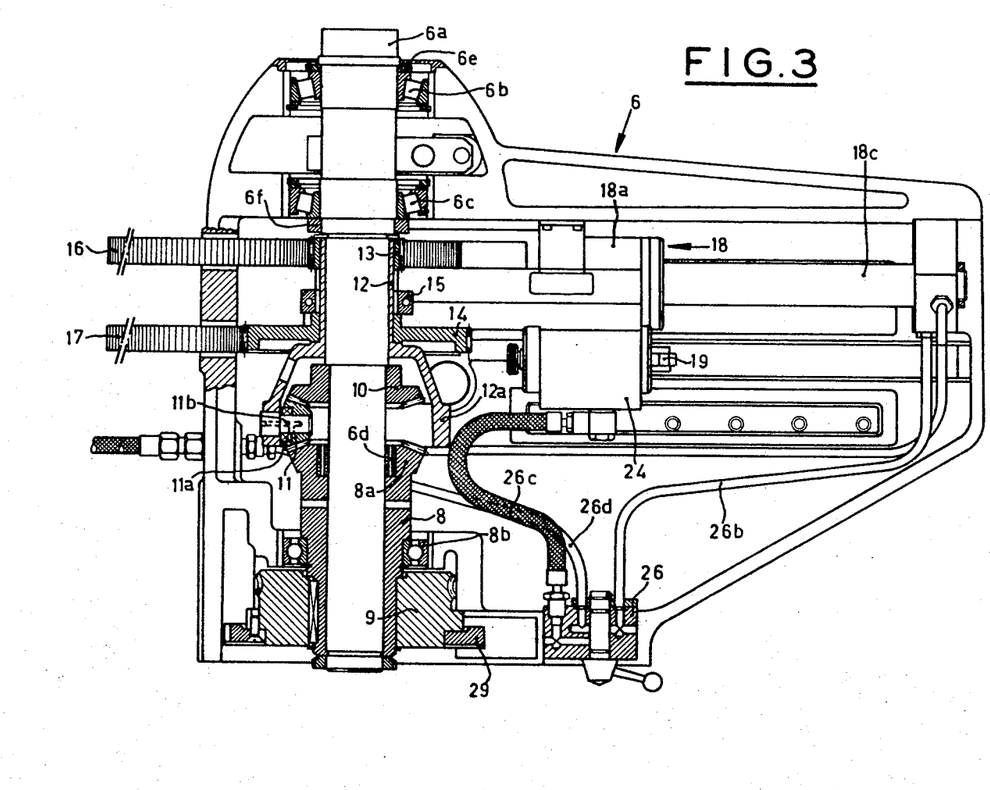
FIGURE 3 is a partial section according to the line III—III of FIGURE 1.
Figure 4:
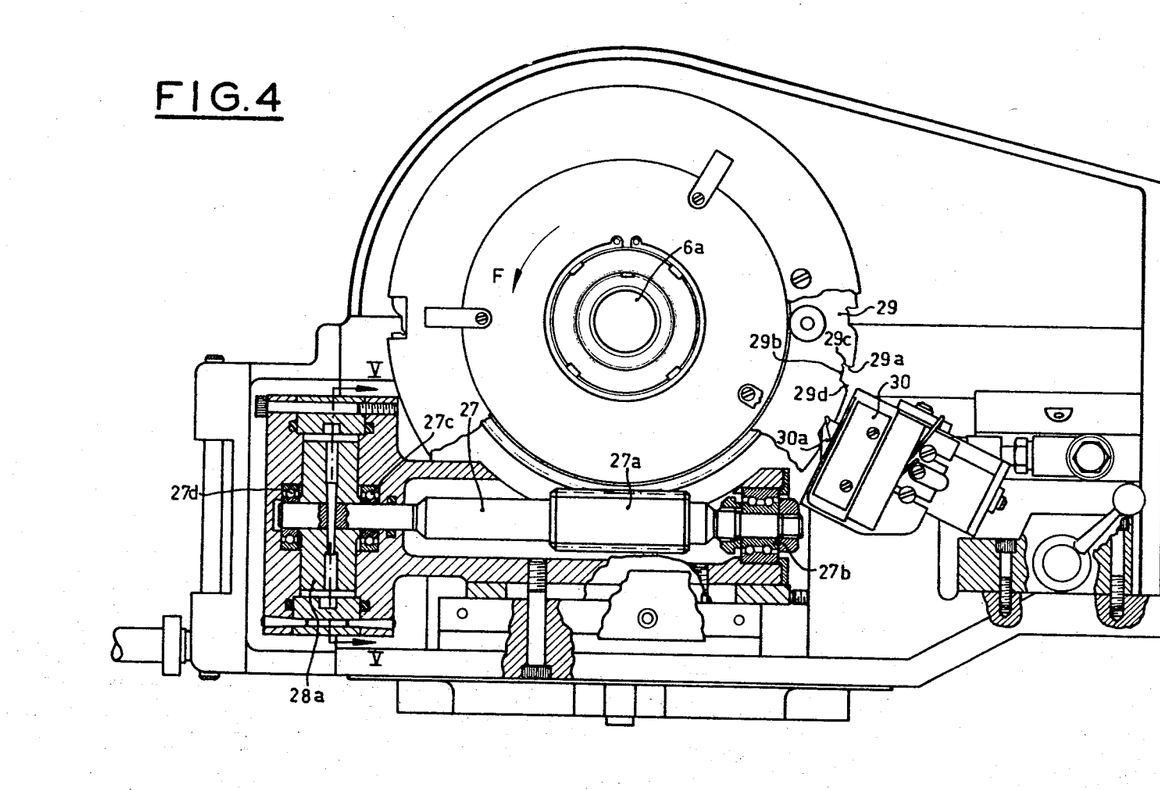
FIGURE 4 is a section along IV—IV of FIGURE 1.

It is the mechanism illustrated in FIGURES 3 and 4 which controls the angular driving of the spindle 6a of the head-stock.

This spindle is pivoted in the case of the head-stock 6 by two tapered roller bearings 6b and 6c and by a roller bearing 6d disposed in the opening of a sleeve 8 forming a gear 8a at one end, pivoted in a roller 8b in its middle part and carrying a gear 9 at its other end.

The axial blocking of the spindle 6a is assured by two rings 6c and 6f engaged on the internal cage of bearings 6b and 6c.

On the spindle 6a is fixed a conical gear 10 of which the characteristics of the teeth, diameter, module and shape, are identical to those of the wheel 8a towards which it faces.

Three planetary gears 11, angularly equidistant and of which only one is shown in the drawing, are carried simultaneously engaged with the gears 10 and 8a; each planetary gear is pivoted by a bearing 11a on an axis 11b perpendicular to the axis of the spindle 6a and fixed on a bell 12a which forms one end of a sleeve 12 pivoted on the spindle and carrying two gears 13 and 14. These gears are mounted loose and are adapted to be alternatively connected to this sleeve by gripping a ring 15, for example with the aid of a bolt and a nut not shown. In the position shown in the drawing, the ring 15 renders the gear 14 rigid to the sleeve 12 while the gear 13 is loose. The gear 13 can be rendered rigid with the sleeve 12 by sliding this ring on the sleeve to bear against the plate 13 and tightening it in this position.

The gear 13 is engaged with the teeth of a horizontal rack 16 and the gear 14 with another similar rack 17. These two racks are adapted to be driven alternatively towards the left and towards the right by the mechanism which will be described now: it is this displacement of the racks which causes the angular driving of the spindle 6a with a higher speed when it is the gear 13 which is connected to the sleeve 12 and when the gear 14 is loose on this sleeve.

The spindle 6a can, however, only be driven if the gear 9 is prevented from turning, as will be seen by the following, the assembly formed by the toothed wheels 8a and 10 and by the bell 12a and its planetary gears 11 forming a differential.

The two racks 16 and 17 are rigid with a cylinder 18a of a control jack 18 of which 18b is the piston and 18c the piston rod. In this jack it is the cylinder which is movable and the piston which is fixed.

Figure 6:
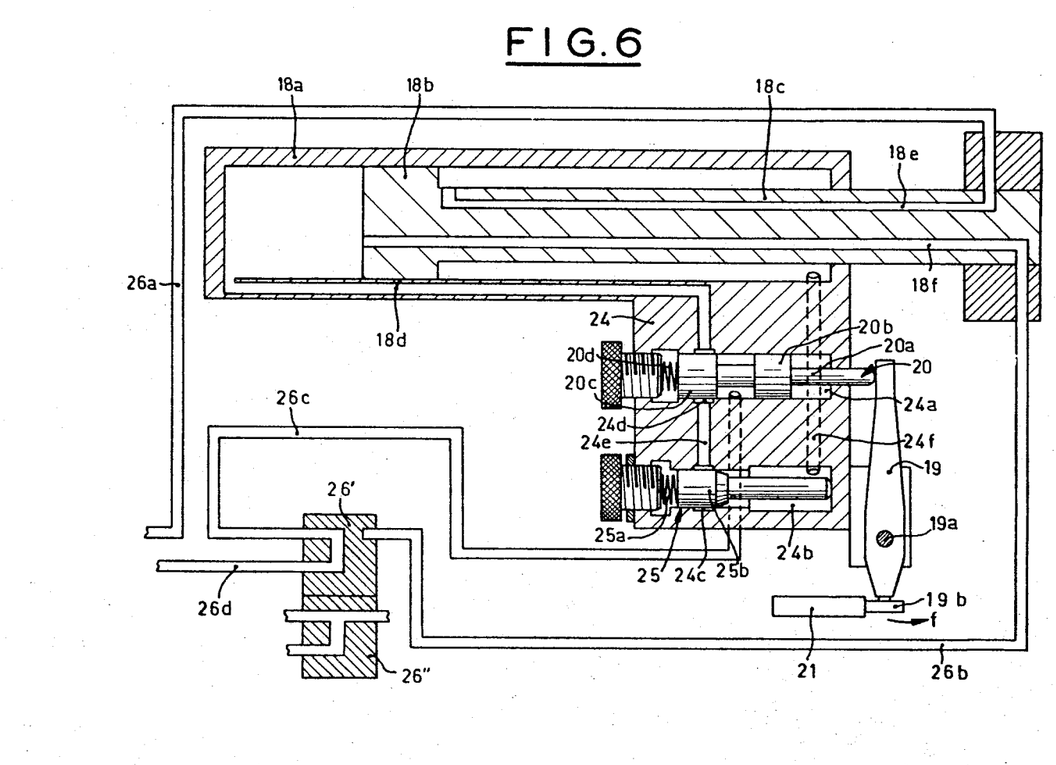
FIGURE 6 shows the schematic hydraulic diagram for the device for driving the spindles of the head-stock of the machine.

FIGURE 6 shows the hydraulic schematic diagram of the supply of the jack. The supply is effected differently according to the angular position of the rocking feeler 19 articulated at 19a and of which the upper end acts on the valve 20 while its lower end carries a roller 19b and is guided by a cam-rule 21 extending in a plane parallel to that of the spindle 6a and of which the inclination, with respect to a vertical plane passing through the axis of this spindle, is chosen identical to that of the slope of the helical generatrix of the milling cutter to be ground.

The cam 21 is fixed on a slider 22 adapted to be displaced perpendicularly to this vertical plane on slides which are carried by a case 23 fixed on a bracket 1b projecting from the left part of the back face of the frame (FIGURE 1).

The valve 20 comprises a rod 20a to which are associated two pistons 20b and 20c and which is slidably mounted, in opposition to a spring 20d, in a tubular housing 24a hollowed in a block 24 associated with the cylinder 18a of the jack 18.

This block is moreover hollowed by a second housing 24b parallel to the housing 24a in which is mounted another valve 25 subjected to a spring 25a tending to make its right end bear against the corresponding wall of the housing 24b. This valve forms a piston 25b which is conical on its right part. When the valve is in the position shown, the cylindrical part of the piston 25b is totally surrounded by an annular chamber 24c communicating with a similar chamber, 24d, surrounding the piston 20c of the valve 20, by a conduit 24e.

This same chamber 24d is in turn connected to the cylinder 18a of the jack, at the left of the piston 18b by a conduit 18d. The space situated at the right of this piston is connected to a housing 24b by a conduit 24f.

The actuating fluid of the jack 18, preferably oil under pressure, arrives in this jack by means of a tube 26a then penetrates into the piston rod 18c by a conduit 18d opening out into the right part of the cylinder.

The oil can only be exhausted from the cylinder by passing through a conduit 18f crossing the piston 18d and all of the rod 18c, this conduit 18f communicating with a tube 26b which flows into a valve 26 having three conduits. In the position shown schematically at 26′, this valve stops all circulation of oil in the conduit 26b and connects a conduit 26c, opening into the housing 24a between the pistons 20b and 20c, with a conduit 26d connected to an oil pump (not shown).

In the position 26″ the conduit 26b is connected to the conduit 26d.

The control of the valve 26 is manual.

Thus if the feeler occupies the position shown in the drawing and the valve 26 is in its position 26′, the oil entering into the cylinder 18a, at the right of piston 18b, escapes directly towards the chamber 24b through the conduit 24f and pushes the valve 25 towards the left in a manner sufficient to be able then to pass into the annular chamber 24c and from there into the annular chamber 24d.

The piston 20c is in a position such that the oil arising in that chamber cannot pass into the conduit 26c and must enter, by the conduit 18d, into the cylinder 18a, at the left of the pitson 18b. As the valve 26 closes the conduit 26b the oil cannot escape there and, the left surface of the cylinder 18a being greater than the right surface of this same cylinder, the cylinder 18a will be driven towards the left in the drawing and with it the racks 16 and 17 which will make the spindle 6a turn in a clockwise direction, looking at the spindle from the tail-stock.

By displacing the feeler 19 in the direction f in a manner sufficient that, by driving the valve 20 against its spring 20d, the chamber 24d is put in communication with the space included between the pistons 20c and 20d in which opens the conduit 26c, the oil coming from the housing 24b will no longer be able to pass through the conduit 18d and into the cylinder 18a at the left of the piston 18b, but will go directly into this conduit 26c and from there to the pump.

The oil pressure in the cylinder 18a will be then much greater at the right of the piston 18b than at the left of this piston and the cylinder will be driven towards the right. It is thus by rocking the feeler 19 in the direction f that the racks 16 and 17 can be brought back to their initial position.

There is, of course, an angular position of the feeler 19 for which the flow of oil able to pass into the space included between the pistons 20b and 20c and from there into the conduit 26c becomes such that the pressure acting on the left and right faces of the cylinder 18a will be in equilibrium and that this cylinder remains stationary.

Moreover the immobilisation of the cylinder takes place immediately that the valve 26 is put in position 26″ for which the conduit 26b is connected to the conduit 26d.

When the rule 21 is inclined as shown in the drawing (FIGURE 2) and the table 2 is displaced towards the right, the feeler 19 tends to remain in the vertical position and follows the profile of the rule with which it is in contact, under the action of the jack 18 which is then fed with oil so that its piston is subjected to a pressure displacing it towards the left (FIGURE 3).

If the table moves towards the left, the same feeler is constantly rocked in the clockwise direction so that the jack 18 is moved towards the right, as was described previously.

To obtain a really precise grinding during displacement towards the right and towards the left of the table, it is indispensable to compensate the slight reproduction error due precisely to the pivoting of the feeler 19 controlling the valve 20. The means with which the machine according to the invention disposes of this effect will be described in the following.

The gear 9 previously described is intended to permit the angular driving of the spindle 6a by an angle corresponding to 360°/n, where n is the number of teeth of the wheel, each time that one of the teeth has been ground. The driving of the spindle 6a takes place when the table occupies its extreme left position.

The gear 9 is, to this effect, engaged with a worm 27a (FIGURE 4) cut in an axle 27 rotatably mounted in some ball bearings 27b, 27c and 27d carrying the rotor 28a of a vane motor 28 (FIGURE 5) fed by oil under pressure coming from one of the two conduits 28b or 28c and returning to the pump by the other conduit.

On the back of the gear 9 is fixed a divider plate 29, in the edge of which is cut by a number of teeth corresponding to that of the milling cutter to be ground or at a multiple of this number.

Figure 5:
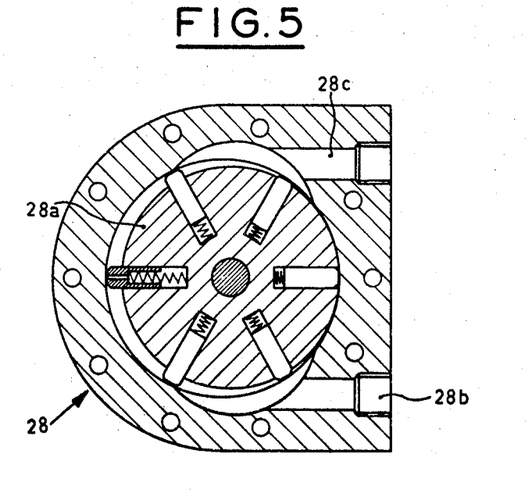
FIGURE 5 is a section along V—V of FIGURE 4.

The oil supply circuit of the motor 28 comprises a set of automatic valves which supply this motor for example by the conduit 28b, so that the gear 9 must rest stationary in a well determined angular position, or by the conduit 28c when this gear must on the contrary be driven in direction F that is to say when the milling cutter to be worked must be turned by 1/n of a turn with respect to the gear 9.

Each of the teeth of the divider plate is delimited by cuts having a plane face 29a extending radially, a face 29b appreciably perpendicular to the face 29a and separated from this latter face by a notch 29c and a face 29d, opposite to the face 29a and slightly rounded in the direction contrary to the direction of rotation F previously indicated. The different notches of the plate 29 are intended to receive alternatively pawl 30a of a contact interrupter 30, this pawl being arranged so as to rock each time that it is carried into contact with the face 29d of each notch, if the plate 29 is driven in direction F.

When this driving is effected in the opposite direction, the pawl 30a abuts against the face 29a of the notch and impedes all rotation of the plate 29.

Each time that the clique 30a jumps on one of the teeth of the plate 29, the interrupter 30 produces an impulse which is directed to a control servomotor which inverts the direction of the supply of oil of the motor 28 as soon as the number of impulses received corresponds to a predetermined order, regulable from case to case according to the number of teeth of the milling cutter to be cut. It is thus that if the cutter has six teeth and the divider plate 29 has 24, the pawl 30a must jump four times on the teeth of the plate before the latter will be stopped.

In principle, the gear 9 is driven in the direction F each time that the table 2 has finished a complete to and fro movement and is in the extreme left position.

The driving in rotation of the toothed plate 29 produces no corresponding movement of the gears 13 and 14 but only the rotation of the spindle 6a. This driving in effect takes place when the racks 16 and 17 are stationary so that the plates 13 and 14 are angularly locked which also impedes all rotation of the bell 12a.

The rotary movement is transmitted from the sleeve 8 to the spindle 6a by the intermediary of the gear 8a, the planetary gears 11 and the gear 10 fixed on this spindle.

As previously indicated, the adoption of a rocking feeler is the source of an error which is translated by a return stroke of the cylinder 18 too short with a value corresponding appreciably to the necessary rocking of the feeler to actuate the valve 20. This error must then be compensated when the feeler rocks, that is to say when the table 2 moves from the right to the left in the drawing, if it is desired that the grinding wheel come into contact with the milling cutter in the same way that this cutter is displaced towards the right or towards the left.

Figure 7:
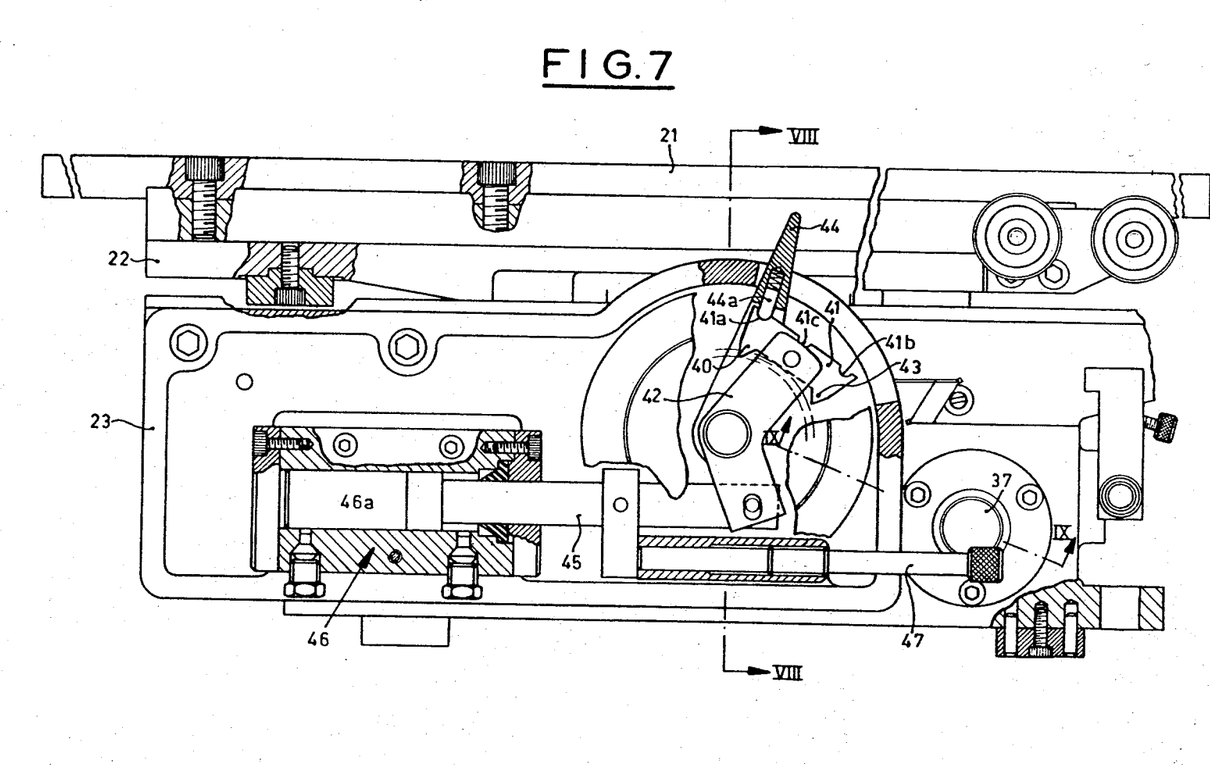
FIGURE 7 is a view of a detail of FIGURE 1 in partial section and on a very large scale.
Figure 8:
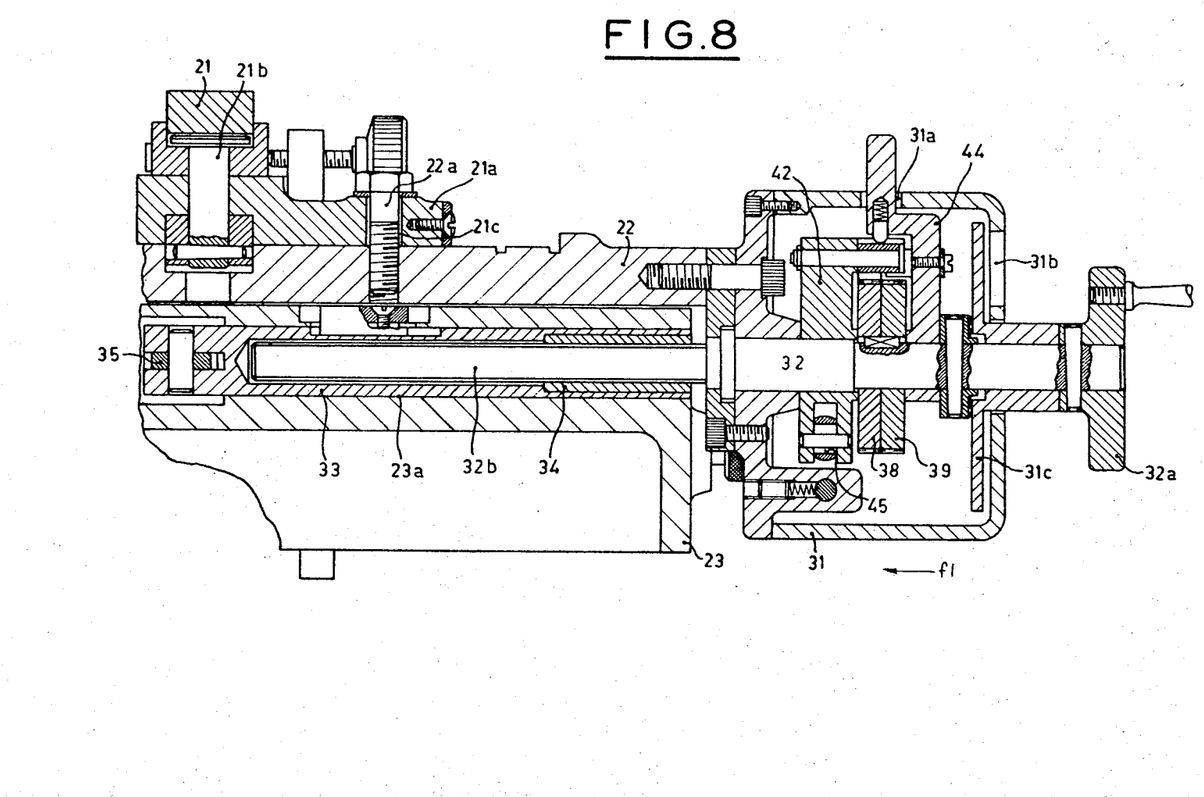
FIGURES 8 and 9 are sections along VIII—VIII and IX—IX of FIGURE 7.
Figure 9:
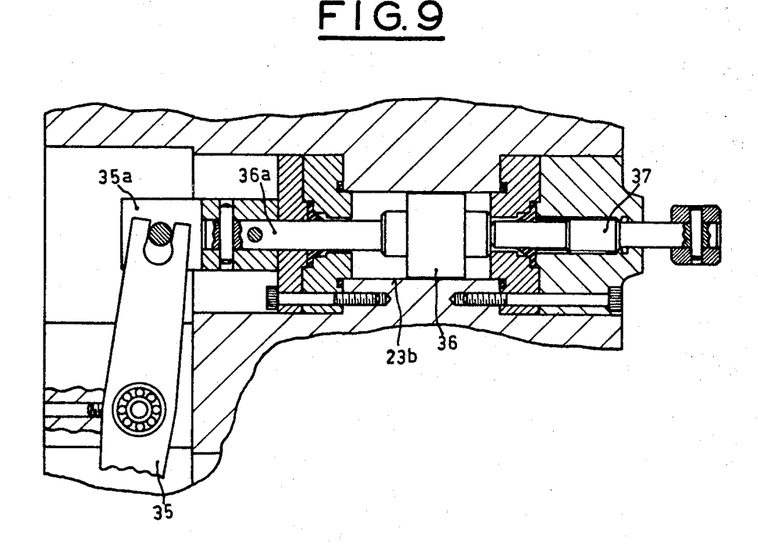

This compensation is achieved by means of members illustrated in FIGURES 7 and 9. In these figures are again found the rule 21, the slider 22 on which it is mounted and the case 23 carrying this slider and which is movably fixed on the bracket 1b of the machine.

This rule 21 is mounted on the slider 22 by an intermediary of a ring 21a articulated on an axle 21b and of which the angular position can be locked by tightening a bolt 22a engaged in a slot 21c of rounded shape formed in the ring 21a.

On the slider 22 is fixed a case 31 in the wall of which is pivoted a horizontal axle 32 carrying a control wheel 32a at one end and threaded at 32b at the other.

This threaded part 32b is engaged in an axial housing 33a provided in a block 33 mounted slidably in a housing 23a of the case 23 and angularly locked by a piece 23b engaged in a groove 33b. In the opening of the housing 33 is fixed a tubular nut 34 with which engages the threaded part 32b.

The block 33 is fixed at its left part in an articulated way to an arm of a lever 35 of which the other arm (FIGURE 9) engages on a leg 35a fixed at the end of the rod 36a of a piston 36 mounted slidably in a housing 23b hollowed in the case 23 and forming a cylinder.

This cylinder is supplied with oil from the left side of the piston 36, so that the table 2 is displaced towards the right, and from the right side of the piston, when the table moves towards the left.

The stroke of the piston 36, and consequently the degree of compensation effected by the displacement of the slider 22 in the direction of the table 2, can be regulated by the action of an axial micrometrical control 37.

The displacement of the piston 36 in its cylinder causes in effect a corresponding sliding of the block 33 in the case 23 and a parallel movement of the slider 22 with respect to the same case.

By means of this stop 37, it is for example possible to only bring the grinding wheel into contact with the milling cutter once per to and fro movement effected by the table, for example, if the piston 36 is applied by its left face against the corresponding face of the cylinder 23b under the action of the stop 37.

This compensation device can of course also serve to compensate other errors due to wear of the pieces of the machine, gears, joints in the hydraulic circuit, etc.

With this machine it is moreover possible to program the work which must be executed, particularly the depth of engagement of the wheel on the teeth to be ground during each pass executed.

To this effect, the rod 32 carries two ratchet wheels 38 and 39 of which the teeth are opposed that is to say that the wheel 38 can only be driven in a determined direction and the wheel 39 in a direction opposed to the first direction.

The wheel 38 is adapted to be driven by a tooth 40 fixed at the end of a lever 41 pivoted on an oscillating lever 42 and the wheel 39 by a similar tooth 43 fixed also on the lever 41 but at the other end. These teeth have a shape such that they can only proceed with the driving of their respective wheel when the lever 42 is driven in the direction f1 by the tooth 40 or in the opposite direction by the tooth 43 and on condition that the lever 41 be maintained in the inclined position of FIGURE 7, when it is the tooth 40 which is the motor or, in a symmetrical position, in the case of the tooth 43. The lever 41 can be carried in one or the other of its two positions by a lever 44 articulated on to the rod 32 and having an elastic bolt 44a adapted to be driven alternatively in three stopping notches 41a to 41c cut on the upper face of the lever 41.

The notches 41a and 41b are disposed respectively to the right of the teeth 40 and 43 associated with the lever while the notch 41c is situated in the plane passing through the axes of pivoting of the lever 42 and of the lever 41. When the lever 44 is carried into an angular position for which the bolt 44a is engaged in the notch 41c, the lever is then in a position such that the teeth 40 and 43 do not make contact either with the wheel 38 or with the wheel 39.

It should be noted that the upper part of the lever 44 makes a projection towards the case 31 across a slot 31a in a manner sufficient to be maneuvered with the fingers.

One end of the lever 42 engages a connecting rod 45 associated with a core 46a of an electro-magnetic relay 46. A contact stud 45a fixed on the connecting rod 45 bears against the left end in the drawing of a micrometrical control stop 47, which permits the stroke of this connecting rod to be limited and consequently the angular displacement of the wheels 38 or 39 to be regulated.

This rotation of the rod 32 in one direction or the other is translated by a corresponding modification of the axial position of the threaded part 32b with respect to the tubular nut 34 and finally by a displacement of the same amplitude of the slider 22 with respect to the case 23 or of the rule 21 with respect to the feeler 19.

Figure 10:
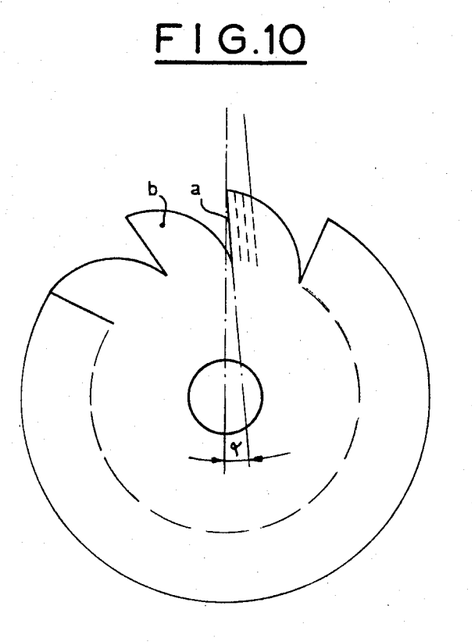
FIGURE 10 shows a partial view, very schematically, of a milling cutter.

This periodic modification of the relative position of the rule and of the feller is always in the same direction whatever be the direction of displacement of the table 2 and is translated by a corresponding movement of a determined amplitude of the milling cutter to be worked with respect to the wheel. Moreover this movement is such that the angle that the right face of each tooth of the cutter makes with the diametrical plane passing through the summit of each tooth, when the cutter is new, remains conserved progressively with the grinding of this wheel, as illustrated in dot dashed lines in the drawing (FIGURE 10).

The excitation of the relay 46 can take place each time that all the teeth of a wheel have undergone a grinding operation, this excitation being controlled by automatic means not shown.

It is also possible to turn the rod 32 by hand, by the action of the wheel 32a, the corresponding displacement of the slider 22 being able to be seen on the graduations carried by a disc 31c visible through a window 31b of the case 31.

The machine represented permits helical milling cutters of any dimension and shape to be ground.

Moreover, it is possible with this machine to work differently the various teeth of a milling cutter taking into account their degree of wear.

What is claimed is:

1. Machine for grinding a tool with a helical cut comprising a wheel-head adapted to receive a grinding wheel, a tool holder table subjected to an alternating to and fro movement, a head-stock having a spindle and a tail-stock mounted on the table and adapted to receive the tool to be ground therebetween, a device for angularly driving the spindle of the head-stock arranged in a manner that the tool effects with respect to the wheel, a helical movement such that the grinding wheel remains always in contact with the surface to be ground and a device permitting the relative position of the wheel and the tool to be varied progressively with the grinding in a manner to be able to achieve this grinding automatically by successive stages, in which the device for angularly driving the spindle comprises at least one rectilinear cam inclined with respect to a reference axis at an angle corresponding to the slope of the helical generatrix of the tool to be ground, at least one feeler in contact with the cam and a servomotor angularly driving the spindle of the head-stock as a function of the relative displacement of the cam and the feeler, perpendicularly to said reference axis, when at least one of these members is driven in the reference axis, the machine furthermore comprising a first slider adapted to be moved perpendicularly to said reference axis, a traversing screw engaged with this slider, a second slider kinematically connected to the screw and carrying the said cam, means permitting the first slider to be displaced by a determined quantity, in one direction, when the table reaches one of its end positions, and in the opposite direction, when the table returns to its other end position, means angularly driving the screw some of the time and in a predetermined direction to displace the said second slider in a manner corresponding to the variation desired for the relative position of the wheel and the tool.

2. Machine according to claim 1, characterized by the fact that the means for the axial driving of the first slider comprise a hydraulic jack having a piston and a cylinder, the jack acting on one end of a lever whose other end is rigid to said slider, and a regulable stop adapted to be placed in the trajectory of the piston of the jack to limit its stroke according to the displacement desired for said first slider.

3. Machine according to claim 2, including a distribution member for the fluid feeding the jack adapted to feed this jack alternatively from one side and from the other side of its piston corresponding to displacement of the table respectively in the one and in the other of the two directions of its to and fro movement.

4. Machine according to claim 1, characterized by the fact that the first slider is formed by a piece, adapted to be displaced axially in a corresponding housing in the frame of the machine and having an axial housing forming a sheath for the traversing screw, this screw remaining engaged with a thread disposed in the opening of the housing at least on a part of its length.

5. Machine according to claim 1, in which the means for angularly driving the traversing screw are formed by two ratchet wheels rigid with this screw and adapted to assure the driving, one in one direction and the second in the other direction, at least one driving lever articulated coaxially with the screw, the driving lever having one arm provided with a rocker, the rocker being provided at one end with a pawl adapted to operate with the first wheel and at the other end a similar pawl adapted to cooperate with the second wheel, another arm of said driving lever being subjected to the action of a control member controlling the angular displacement of said lever corresponding to the said variation of the relative position of the grinding wheel and the tool, means permitting the one or the other of said pawls to be put into engagement with the corresponding ratchet wheel according as this variation must be produced in one direction or in a direction opposite to the said one direction.

6. Machine according to claim 5, in which the rocker has, on its face opposed to said ratchet wheels, three notches of which two are disposed each facing one of the pawls and the third on an axis passing through the center of pivoting of the rocker on the lever and through the axis of the screw, the machine including a bolt adapted to be engaged alternatively in the one or the other of these notches to maintain this rocker in one or the other of these inclined positions for which one or the other of the pawls makes contact with its corresponding ratchet wheel, the bolt cooperating with the third notch when the lever must not be connected kinematically to the traversing screw.

7. Machine according to claim 6, including means adapted to permit the possible angular displacement of the lever to be regulated.

References Cited

UNITED STATES PATENTS

| 1,870,764 | 8/1932  | Aeppli    | 51—123   |
| 2,258,510 | 10/1941 | Laessker  | 51—95    |
| 2,401,561 | 6/1946  | Gruenberg | 51—95    |
| 2,791,068 | 5/1957  | Habib     | 51—232 X |

LESTER M. SWINGLE, *Primary Examiner.*